(12) United States Patent
Valcalda

(10) Patent No.: US 6,640,964 B2
(45) Date of Patent: Nov. 4, 2003

(54) DEVICE FOR AUTOMATIC CENTERING OF BELT CONVEYORS

(75) Inventor: Florent Valcalda, 73 Rue Nationale, 95490 Vaureal (FR)

(73) Assignee: Florent Valcalda, Vaureal (FR)

( * ) Notice: Subject to any disclaimer, the term of this patent is extended or adjusted under 35 U.S.C. 154(b) by 0 days.

(21) Appl. No.: 10/279,440

(22) Filed: Oct. 24, 2002

(65) Prior Publication Data

US 2003/0094351 A1 May 22, 2003

Related U.S. Application Data

(63) Continuation of application No. PCT/FR10/01003, filed on Apr. 4, 2001.

(30) Foreign Application Priority Data

Apr. 25, 2000 (FR) .............................................. 00 05550

(51) Int. Cl.[7] .............................................. B65G 39/16
(52) U.S. Cl. ...................................... 198/808; 198/826
(58) Field of Search ................................ 198/808, 826, 198/827, 830

(56) References Cited

U.S. PATENT DOCUMENTS 736,905 A * 8/1903 Willson, Jr. ................. 198/826
1,973,095 A * 9/1934 Muller ..................... 198/808 X
3,240,321 A * 3/1966 Presti et al. ................. 198/808
4,936,443 A * 6/1990 East ............................ 198/827
5,248,029 A   9/1993 Valcalda ..................... 198/808

FOREIGN PATENT DOCUMENTS

WO          0 504 036 A1   9/1992   ........... B65G/39/14

* cited by examiner

*Primary Examiner*—James R. Bidwell
(74) *Attorney, Agent, or Firm*—Heslin Rothenberg Farley & Mesiti P.C.; John Pietrangelo

(57) ABSTRACT

A device for automatic centering of a conveyor with belts supported by chain flexible rollers is disclosed. The device includes a central attachment receiving rollers with a V-shaped angular orientation. The device also includes a rocking lever subjected to a displacement along a curved trajectory according to variation in altitude. The lever cooperates at its lower end with a fixing lug secured to a tensioning cable mounted to the frame bearing the conveyor. The invention is characterized in that the rollers (20) of the central attachment are mounted for rotation on their independent shafts (21) and the shafts are detachably secured to the central attachment by a central fastening device or stirrup (22). The central fastening device (22) is attached to a fastening device (23). Fastening device (23) is adapted to receive rocking lever (24), which is mounted to the cable by fixing lug (25).

15 Claims, 5 Drawing Sheets

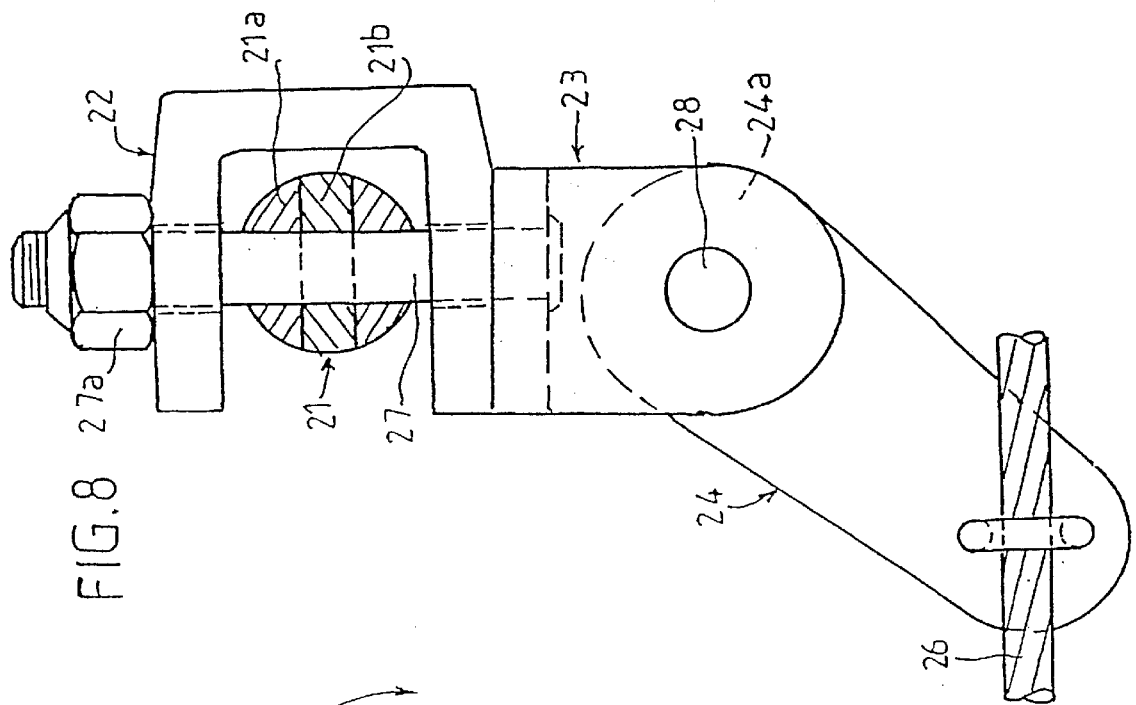
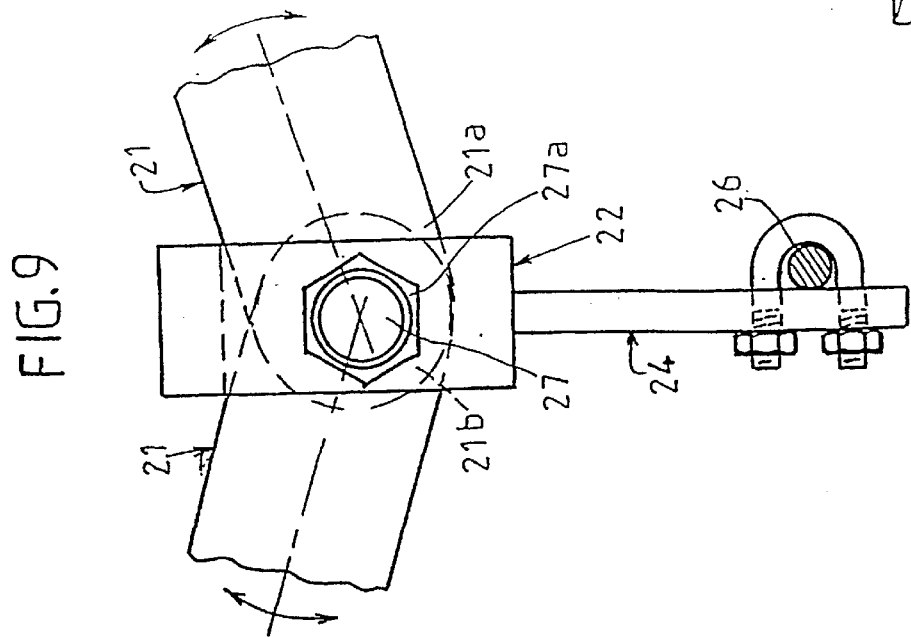

DEVICE FOR AUTOMATIC CENTERING OF BELT CONVEYORS

CROSS REFERENCE TO RELATED APPLICATIONS

This application is a continuation of PCT application PCT/FR10/01003 filed on Apr. 4, 2001, which claims priority from French application FR 00.05550 filed on Apr. 25, 2000.

BACKGROUND AND OF THE INVENTION

The invention relates to the materials handling sector and the continuous transport of materials by conveyor belts, and in particular to conveyor belts which are formed into a trough and supported by flexible elastic rollers.

The Applicant is the owner of European patent 506 036 (corresponding to U.S. Pat. No. 5,248,029, the disclosure of which is incorporated by reference herein in its entirety) which relates to an automatic centering device for this type of conveyor belt which is satisfactorily marketed under license according to a regular development that validates and justifies the technical choices in the said European patent.

In order to facilitate understanding of the invention in the present improvement, specific reference is made to the original invention as shown in FIGS. 1, 2 and 3 attached.

More particularly, according to the said European patent the automatic centering device for flexible conveyor belts is supported by two rows of flexible rollers (4) comprising a single central fastening (9) providing a positive toe-in angle which recalls the trough-shaped belt to a stable dynamic equilibrium on the axis of the conveyor.

The single central fastening (9) which is located lower than the external roller fastening points (5) and is common to each pair of said flexible rollers (4) is movable and, when its altitude varies with the load, it has a curved trajectory matching the longitudinal trajectory of the belt imposed on it by the rotation of the swinging lever (10) supporting the single movable central fastening around the stationary pin (12) so as to reduce the toe-in angle according to the load carried.

The trajectory of the central fastening rotating around the fixed pin is adjusted so that the toe-in is cancelled out for the maximum value of the load transported.

A conveyor belt implementing the aforementioned automatic centering devices uses several strings disposed in alignment on the trajectory in question to ensure transport and handling of the load.

To this end the central fastenings (9) of several flexible supports are connected to one another by their respective levers attached to a tensioning cable. The stationary pin (12) of each of the said levers is connected to an attach tab (6) fastened to said cable disposed along the longitudinal axis (13) of the tensioned conveyor between an adjusting screw (15) and tensioning means (16) that are themselves fastened to the conveyor chassis.

The conveyor belts described that implement the conveyor belt automatic centering device are marketed under the trade mark "Valrol" in France and "Wackem" in Italy and Spain.

On a conveyor belt the carrying run is subject to load variations due to variations in the rate of materials being transported while the return run of the conveyor belt is subject to the same load variations under certain specific circumstances:

where the conveyor belt also carries materials on its return run; in this case it is subject to the same treatment as the carrying run;

where in certain zones of the conveyor belt, convex segments (centre down) or curves on the horizontal plane, the variations in the rate cause variations in the tensions in the belt and hence variations in the load on all the strings of rollers in the zone in question, hence desirable variations in the toe-in angle of the rollers forming the said strings.

The embodiment of patent EP 504 036 with, in particular, the central cable and the associated tensioning devices together with the swinging lever and the attach tabs fastened to the cable have their use on both the carrying run and the return run.

Even though this embodiment is perfectly satisfactory, the Applicant's approach is to try to further improve the operation and standardisation of the conveyor belt automatic centring device and the components associated therewith.

This approach has resulted from various findings.

Firstly, the single central fastening (9) described in EP 504 036 incorporates an integral V-shaped shaft (11) on which are fastened two rollers (4).

This single central fastening, the height of which varies according to the load being carried, supports the swinging lever (10) that rotates around stationary pin (12) allowing adjustment of the toe-in angle under no-load conditions and reduction of the said toe-in when the load increases.

This single central fastening can have several drawbacks that nevertheless do not undermine the basic concept of the main invention.

Firstly, the angle formed between the V-shaped shaft (11) and the horizontal axis is constant irrespective of the curve of the assembly created by the single central component (9) and the two rows of elastic rollers (4).

This single central component requires fitting of the two rollers on the V-shaped shaft thereby creating an assembly that is fastened to the shaft. This means that the swinging lever cannot be removed and the entire single central component has to be removed even if only one component thereof is worn.

This situation may cause problems as the central fastening is the fastening most subject to stress and it is sometimes necessary to replace it with spare parts.

It will easily be understood that if one of the rollers is worn, having to replace the central fastening assembly greatly increases the cost of repair and replacement.

A further drawback lies in the fact that the said single central fastening included in embodiments of the concept disclosed in EP 504 036, by reason of its V-shaped shaft, requires special packing for storage and delivery operations. This is due to the non-linear nature of the string formed by the central component, the two rows of elastic rollers and the end-fastenings.

The Applicant's approach has therefore been to take these findings and examine how it is possible to optimise the general concept patented in EP 504 036 in order to reduce the repair costs, facilitate changing the rollers when worn and also bring greater elasticity to the central fastening assembly, particularly the rollers which, even when adjacent do not necessarily bear the same load.

The Applicant's approach has therefore been to optimise this fastening system.

The Applicant's approach has also been to rationalise and standardise the various components that can be used in this fastening concept on both the carrying run and return run of the conveyor belt wherever variations in the load carried or the tensions due to variations in the rate require changes of toe-in angle.

All these factors have caused the Applicant to find a technical solution that does not threaten the correct operation of the concept patented in EP 504 036 but which also offers improvements and substantial gains in productivity when using embodiments of the present invention.

These goals and others will become clear from the rest of the description.

According to a first aspect of the invention, the improved automatic centering device for a conveyor belt supported by a string of elastic rollers in which the toe-in angle varies according to the load carried, the device being of a type including a central fastening that receives rollers oriented in a V configuration between which is disposed a swinging lever that is subject to a movement in a trajectory that curves according to the variation in altitude due to the load on the conveyor belt, the lower end of the said lever operating in conjunction with an attach tab fastened to an adjustable tensioning cable relative to the bearing chassis of the conveyor belt, the central fastening rollers being mounted so they are free to rotate on their independent axles oriented in a V configuration, the said axles being fastened to but removable from an opposite end, at a given angle, by central fastening means, said central fastening means being fastened to an attach tab designed to receive so that it may be dismantled and so that it pivots, the swinging lever, the other end of which is fastened to the attach tab fastened to the tensioning cable.

These aspects and others will be understood from the rest of the description.

BRIEF DESCRIPTION OF THE FIGURES

The description is of a non-limitative example and refers to the attached figures where:

FIG. 8 is a side view showing the device of the invention applicable to the central fastening known as the "return run".

FIG. 9 is a view along the axis of the conveyor belt of FIG. 8.

DETAILED DESCRIPTION OF FIGURES

Figure 1:
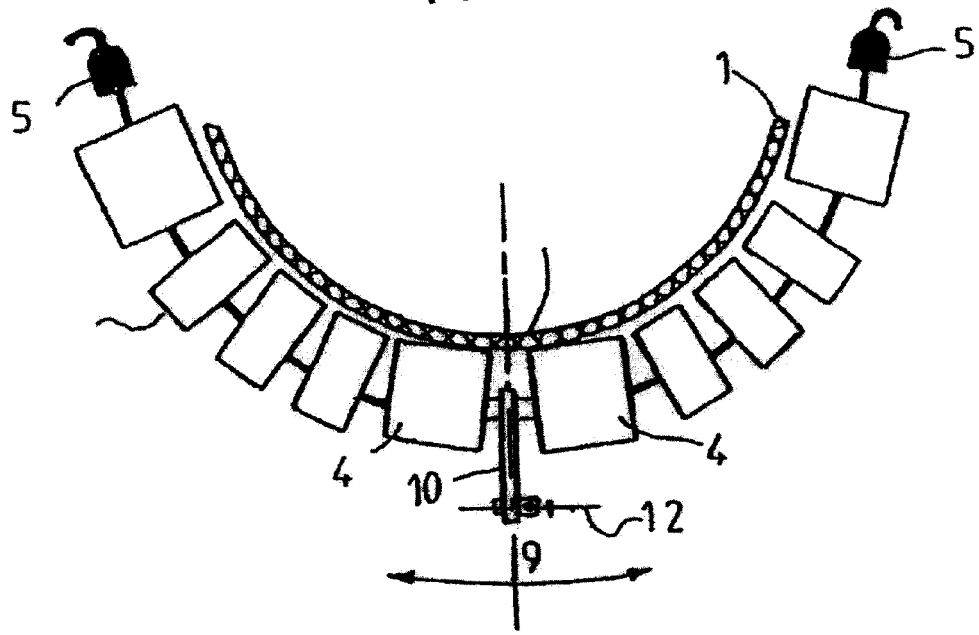
FIG. 1 shows the prior art as defined in the Applicant's patent EP 504 036 for the general concept of an automatic centering device for a conveyor belt.
Figure 2:
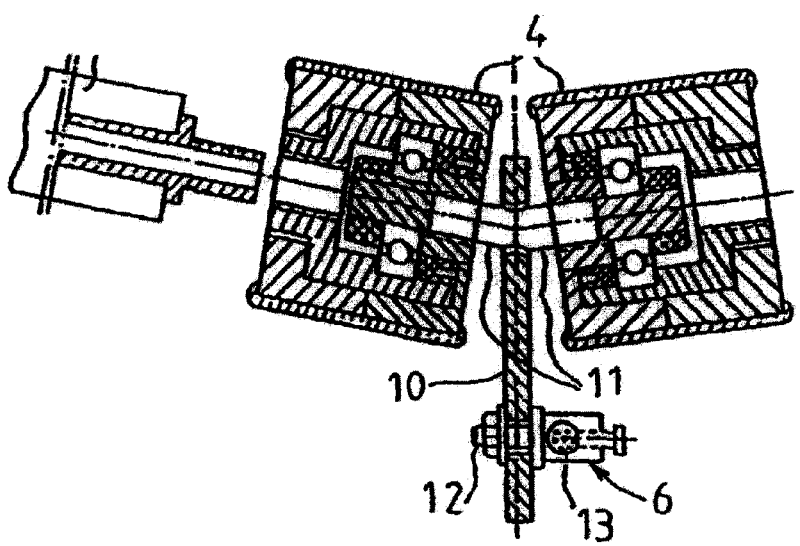
FIG. 2 is a partial cross-section showing details of the central fastening of the prior art as defined by the aforementioned EP patent.
Figure 3:
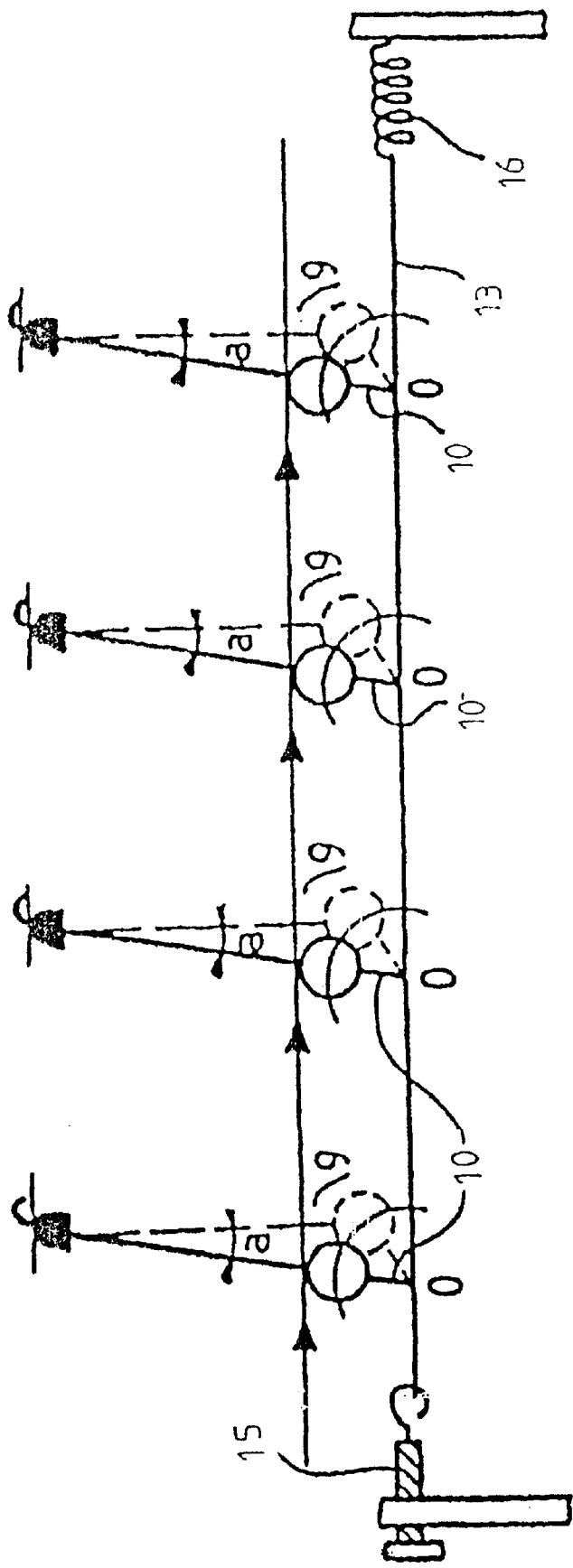
FIG. 3 is a schematic view showing the adjusting device of the fastening point for the central fastening according to the aforementioned EP patent.
Figure 4:
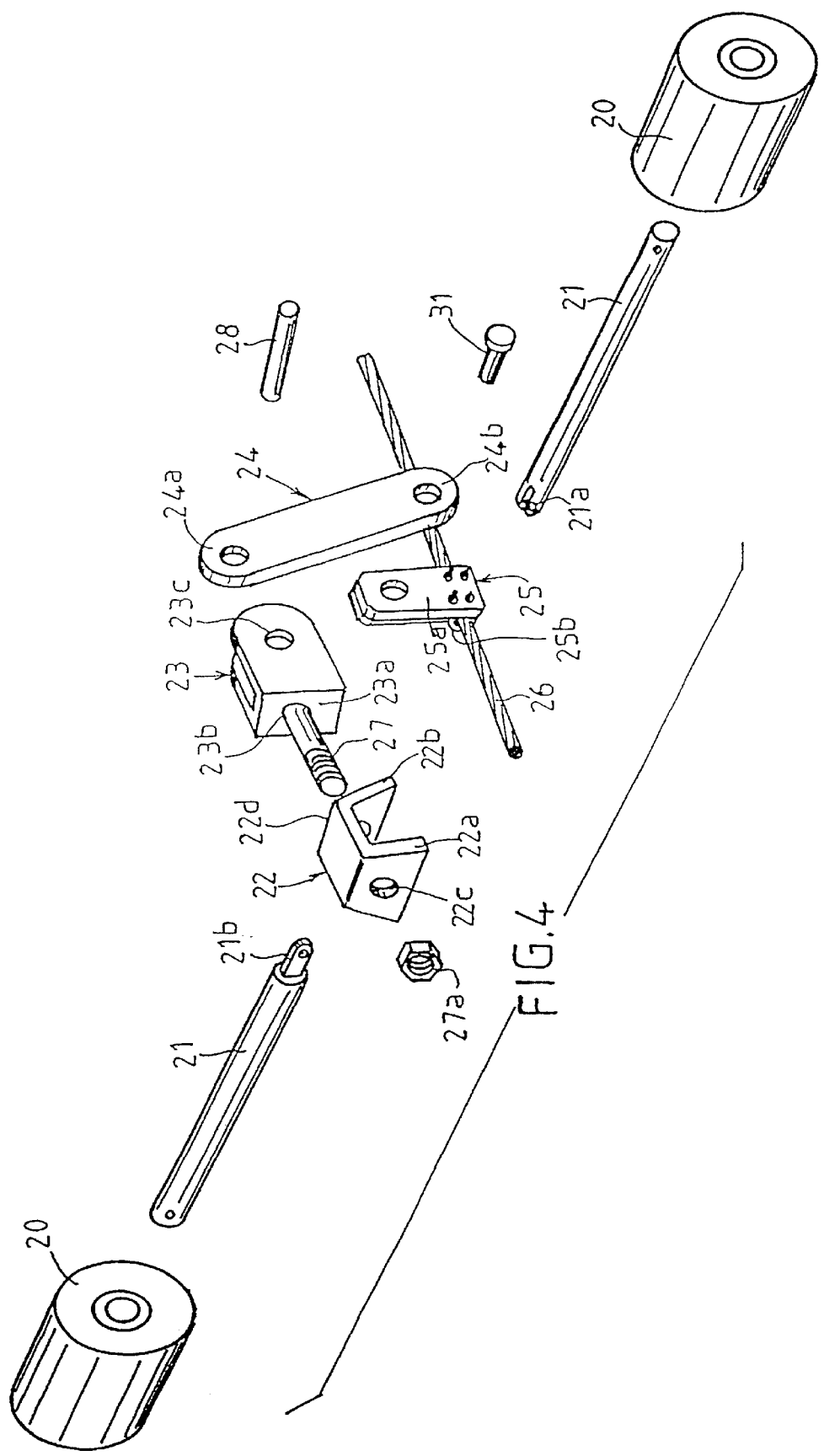
FIG. 4 is a partial view of the central fastening of the invention in an exploded view before assembly of its components.
Figure 6:
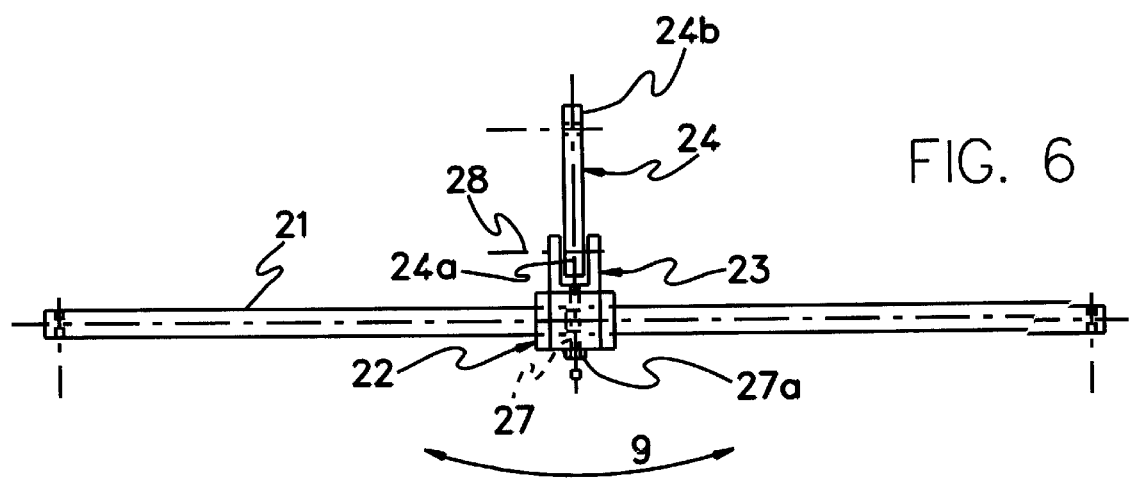
FIG. 6 is a-top view according to FIG. 5.
Figure 5:
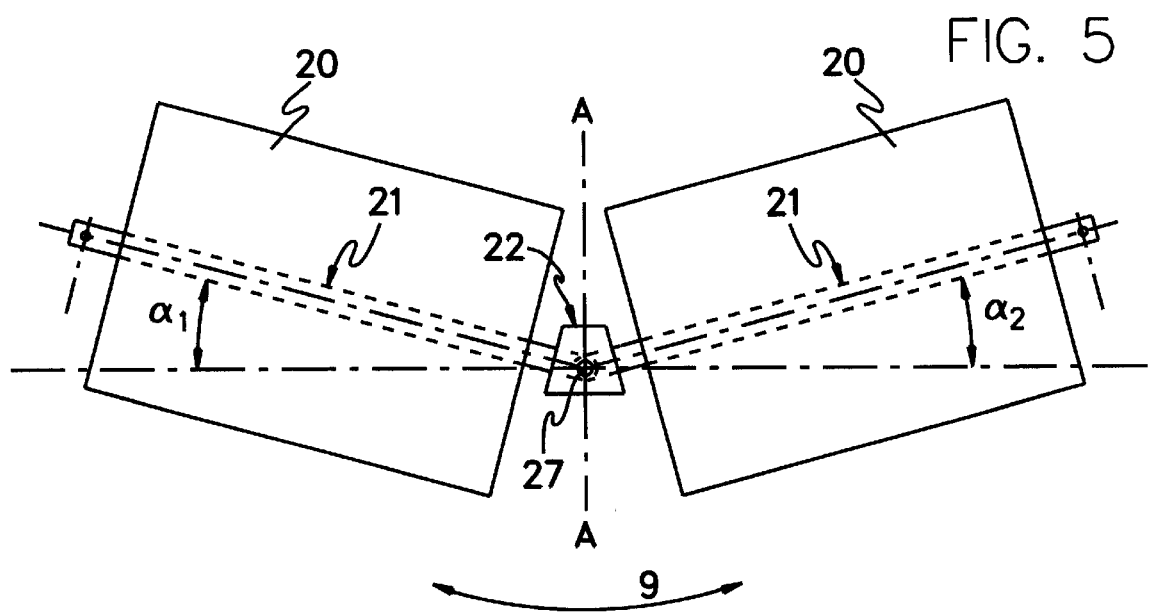
FIG. 5 is a partial front view of the device of the invention.
Figure 7:
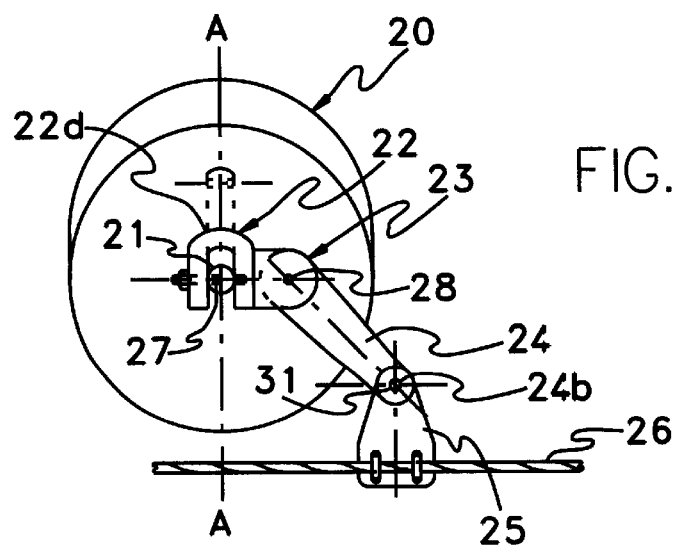
FIG. 7 is a partial view along line AA showing the relation of the device of the invention to the cable tensioning system.

In order to make the invention more concrete, a non-limitative description will now be given with reference to the figures.

As in the description of patent EP 504 036, the central fastening is numbered (9). It constitutes a single central part but according to the invention is composed of several distinct components that can be disassembled from one another and achieve the objectives required and aimed at by the invention.

These separate components successively comprise two rollers (20) mounted to rotate freely on their independent axles (21) that are oriented in a V-shape, central fastening means (or stirrup) (22) for fastening the axles at a given angle, a fastening means (23) fastened to central fastening means (22), said fastening means (23) receiving and pivoting a swinging lever (24) that is itself attached to an attach tab (25) mounted on tensioning cable (26).

More particularly the axles (21) of the said rollers (20) have complementary mortise/tenon fastening profiles (21a–21b) or similar capable of constituting a male/female assembly, fastening being achieved by means of a fastening pin (27) or equivalent that passes through the aforementioned central fastening means (22) or other fastening means.

The central fastening means (22) has the configuration of a stirrup with a U-shaped cross-section the side-pieces of which (22a–22b) are provided with apertures (22c) designed to allow the passage and introduction of the fastening pin (27) through the end profiles (21a–21b) of the axles bearing the rollers (20), a nut (27a) holding the entire assembly in place.

The fastening means (23) of swinging lever (24) is configured as a U-shaped fork or similar configuration that can be made removable from the aforementioned stirrup (22) as follows:

The outer bottom surface (23a) of the said fork (23) is capable of bearing upon the outer surface (22d) of one of the side-pieces of the stirrup (22). The bottom surface (23a) of the fork capable of presenting an aperture (23b) allows the passage of the fastening pin (27) that retains the axles (21) supporting the rollers (20), bolting means (27a) being disposed at the end of the said male pin to fasten the assembly.

Consequently fastening by means of bolts or similar firmly fastens the said fork (23) of said swinging lever (24) relative to the support stirrup (22). The head (27b) of the fastening pin bears on the inner surface of the fork.

Without departing from the scope of the invention, it can be imagined the fastening and swinging lever of the stirrup being manufactured as a single part obtained by casting or similar, their shape being adapted to allow both the reception of the ends of the roller support axles and their fastening as well as insertion of the swinging lever and its fastening.

The side-pieces (23d) of the fork shape (23) are capable of having apertures (23c) allowing the insertion of a fastening component (28) passing through the upper end of the swinging lever. This fastening means is of the screw-nut type or equivalent.

Swinging lever (24) is therefore fitted freely relative to the aforementioned pin (28) at its end (24a) and may be removed. To achieve this it is enough to remove any fastening means associated with the fastening, whether pin type or other.

The other end (24b) of swinging lever (24) is hinged on attach tab (25) that is attached to the tensioning cable. This attach tab (25) is of the type described in aforementioned EP patent. It comprises two plates (25a–25b) connected to one another by fastening means and allows insertion into the volume thereby created of the tensioning cable (26). A locking screw (31) or equivalent connects the lower end of the swinging lever to the attach tab (25). The fastening may preferably be removable. The cable is capable of receiving as above several central fastening assemblies of aforementioned type with elastic return tensioning components as explained above.

This arrangement is particularly advantageous in that it meets various of the original needs. The free mounting of the two upper rollers relative to their fastening axle allows variations in angles α1 and α2 formed by the said roller axles with the horizontal axis of the assembly thereby formed; this variation is dependent on the distortion of the curve of the string with the central fastening component of the flexible rollers during variations in amplitude of the single central fastening caused by variation in the loads carried; it is also dependent on the radius of curvature of the half-circumference caused by variations in the widths of the belts used.

This arrangement also makes it possible to adjust the spacing between the skirts of the rollers composing the central part and to reduce this spacing under load, thereby preventing the belt from being caught between the two skirts of the rollers.

The rollers are therefore capable of angular azimuth displacement while limiting such angular displacements to a given value. The fastening point of the ends of the roller axles composed of the stirrup (22) defines the axis of angular movement and limits this movement to the preset values.

The part forming the stirrup will therefore follow the variations in altitude of the single central fastening thus formed causing the fastening (23) of the swinging lever (24) to adopt this movement, and when the altitude of the central part varies with the load carried, the swinging lever itself has a curved trajectory matching the direction of the longitudinal trajectory of the belt around a fixed pin of the swinging lever imposed on it so as to reduce the toe-in angle when the load carried is increased.

As before the curved trajectory of the single central component is adjusted such that the toe-in is cancelled out when the maximum value of the load transported is obtained.

The invention thus very satisfactorily solves the problems initially posed. If one of the components is worn it is easy to remove and replace it. This operation may be performed by any person, the essential point being subsequently to adjust the toe-in angles.

This improvement of the invention applies both to the upper belt of the conveyor belt and the return run.

FIGS. 8 and 9 show the same arrangement applied to the return belt using the same components, therefore incontestably allowing the parts constituting the central fastening of the invention to be standardized both on the upper belt and the return run.

This represents a considerable advantage that allows manufacturing costs to be reduced substantially and the replacement of parts to be facilitated. There is no multiplication of parts to suit the upper belt or return run and in situ adaptability is therefore easy.

If removability is an objective, it is possible, without modifying the idea behind the invention and its operating conditions, for the said lever to be rigidly mounted at one or both of its ends. In this configuration, however, it is more difficult to control and achieve the toe-in angle.

The advantages of the invention are clear and its simplicity should be noted, particularly the elimination of special packaging for the central fastening as defined in EP 504 036.

During shipping and packing the special mounting of the rollers (20) on their independent axles (21) hinged on the fastening part (22) makes it possible to present them with the matching string assembly and associated suspension hooks in a straight section that is easy to package.

What is claimed is:

1. A centering device for a conveyor belt, the conveyor belt mounted on a plurality of flexible rollers, the flexible rollers having a toe-in angle, the centering device comprising:

a central fastening means;

at least two axle for rotatably mounting at least two of the plurality of flexible rollers, the at least two axles pivotally mounted to the central fastening means;

a lever pivotally mounted to the central fastening means; and a tab pivotally mounted to the lever and rigidly mountable to a cable;

wherein the toe-in angle of the flexible rollers is varied by moving the cable.

2. The centering device as recited in claim 1, wherein the at least two axles comprise a first axle having an axis which defines an angle α1 with the horizontal and second axle having an axis which defines an angle α2 with the horizontal, and herein α1 and α2 may be varied.

3. The centering device as recited in claim 1, wherein the central fastening means comprises at least one pin, and wherein the at least two axles are pivotally mounted to the at least one pin.

4. The centering device as recited in claim 3, wherein the central fastening mean comprises a stirrup having at least one aperture adapted for retaining the at least one pin.

5. The centering device as recited in claim 1, wherein the central fastening means comprises a lever fastening means, and wherein the lever is pivotally mounted to the lever fastening means.

6. The centering device as recited in claim 3, wherein the central fastening mean comprises a lever fastening means, and wherein the at least one pin is mounted to the lever fastening means.

7. The centering device as recited in claim 5, wherein the lever comprises a first end and a second end, wherein the first end of the lever is pivotally mounted to the lever fastening means and the second end of the lever is pivotally mounted to the tab.

8. The centering device as recited in claim 1, wherein the conveyor belt comprise at least one of an upper conveyor belt and a return conveyor belt.

9. The centering device as recited in claim 4, wherein the central fastening means further comprises a lever fastening means.

10. The centering device as recited in claim 9, wherein the lever fastening means comprises a fork adapted for pivotally mounting the lever.

11. The centering device as recited in claim 4, wherein the stirrup comprises side pieces having apertures, and wherein the apertures are adapted to receive the at least one pin.

12. The entering device as recited in claim 11, wherein the at least one pin comprise a threaded pin and the at least one pin is secured to the stirrup by at least one threaded fastener.

13. The entering device as recited in claim 5, wherein the lever fastening means comprises a fork, and wherein the fork is adapted to pivotally mount the lever.

14. The centering device as recited in claim 3 wherein the at least two axles comprise a first axle and a second axle, the first axel having a first end and the second axle having a first end, wherein the first end of the first axle and the first end of the second axle are adapted to receive the at least one pin.

15. The centering device as recited in claim 14, wherein the first end of the first axle an the first end of the second axle are adapted to engage in a male-female configuration.

* * * * *

UNITED STATES PATENT AND TRADEMARK OFFICE
CERTIFICATE OF CORRECTION

PATENT NO.    : 6,640,964 B2
DATED         : November 4, 2003
INVENTOR(S)   : Valcalda It is certified that error appears in the above-identified patent and that said Letters Patent is hereby corrected as shown below:

Column 1,
Line 11, insert the word -- SUMMARY -- after the word "AND"

Column 6,
Line 2, delete the word "axle" and insert the word -- axles --
Lines 51 and 54, delete the word "entering" and insert the word -- centering --
Line 52, delete the word "comprise" and insert the word -- comprises --
Line 64, delete the word "an" and insert the word -- and --

Signed and Sealed this

Twenty-third Day of December, 2003

JAMES E. ROGAN
*Director of the United States Patent and Trademark Office*